United States Patent [19]
Sullivan et al.

[11] Patent Number: 5,982,142
[45] Date of Patent: Nov. 9, 1999

[54] STORAGE BATTERY EQUALIZER WITH IMPROVED, CONSTANT CURRENT OUTPUT FILTER, OVERLOAD PROTECTION, TEMPERATURE COMPENSATION AND ERROR SIGNAL FEEDBACK

[75] Inventors: James D. Sullivan, Galena; John A. Melvin, Westerville, both of Ohio

[73] Assignee: Vanner, Inc., Hilliard, Ohio

[21] Appl. No.: 09/083,735

[22] Filed: May 22, 1998

[51] Int. Cl.⁶ ...................................................... H02J 7/00
[52] U.S. Cl. ............................................. 320/118; 320/127
[58] Field of Search .................................... 320/118, 127; 307/66

[56] References Cited

U.S. PATENT DOCUMENTS

| | | |
|---|---|---|
| 4,184,197 | 1/1980 | Cuk et al. . |
| 4,479,083 | 10/1984 | Sullivan . |
| 5,528,122 | 6/1996 | Sullivan et al. . |

Primary Examiner—Peter S. Wong
Assistant Examiner—K. Shin
Attorney, Agent, or Firm—Frank H. Foster; Kremblas, Foster, Millard & Pollick

[57] ABSTRACT

A three terminal battery equalizer which includes a DC—DC converter has a first filter inductor in the switched, current conducting path connected to the battery ground and a second filter inductor in the switched, current path connected to the non-grounded, non-interconnected terminal of a second battery, and has a capacitor connected between the filter inductors for maintaining the same magnitude of current in the battery equalizer during the time interval when the switching transistors of the DC—DC converter are turned off, as when the transistor switches are turned on. The circuit further includes an error signal feedback circuit for controlling the transistor switches and protective feedback circuits, all providing signals which are integrated to eliminate the effect of alternating voltages, resulting from isolation of the control circuit from the battery circuit. The protective circuits include output current detection for overload protection, reverse polarity protection and temperature compensation.

21 Claims, 7 Drawing Sheets

STORAGE BATTERY EQUALIZER WITH IMPROVED, CONSTANT CURRENT OUTPUT FILTER, OVERLOAD PROTECTION, TEMPERATURE COMPENSATION AND ERROR SIGNAL FEEDBACK

BACKGROUND OF THE INVENTION

1. Field Of The Invention

This invention relates generally to battery power supply systems, such as used in vehicles, and more particularly relates to an electronic circuit for equalizing the voltage on two or more series connected storage batteries.

2. Description Of The Related Art

Many commercial vehicles, such as buses, utility trucks and tractors, are provided with on board electrical systems, including one or more batteries, for supplying electrical power to a variety of electrical loads, such as lights, specialized equipment and vehicle accessories. Some of these loads are motors, such as a starting motor for a large diesel engine, or for driving air conditioners, which must provide a high torque and therefore have a high power requirement. It is desirable to supply such high power loads at a voltage greater than 12 volts, such as 24 volts, in order to meet the high torque requirements without excessive current and consequent resistive losses. However, storage batteries for use on vehicles are conventionally manufactured with a standard 12-volt nominal battery voltage. Furthermore, lights, fare boxes, radios, transmissions and many accessories and other equipment for use on vehicles are also conventionally manufactured for use with a nominal 12 volt system.

Therefore, it is desirable to take advantage of the cost savings resulting from use of conventionally available 12 volts electrical equipment and 12 volt batteries on a vehicle while also providing a DC supply voltage greater than 12 volts in order to supply the larger loads, such as motors. This has traditionally been accomplished by utilizing two or more 12 volt batteries connected in series. The high power requirements can then be delivered at the sum voltage of the series batteries and yet power can be supplied to the 12 volt loads at the voltage of the 12 volt batteries. In this manner, the 12 volt loads can be supplied by connecting them in parallel to one of the 12 volt batteries, typically the battery which is connected to vehicle ground, and the higher voltage loads can be connected parallel to the entire set of series connected batteries.

Unfortunately, however, in the absence of additional circuitry, such connection causes the battery which is parallel to the 12 volt loads to become undercharged, drained, and reduced in voltage, while the other battery or batteries becomes overcharged and raised to an excessive voltage. This occurs because the alternator is connected parallel to the series connected batteries and consequently all charging current which is used to charge the battery supplying the 12 volt loads must also flow through the other 12 volt battery or batteries. Therefore, a series battery which does not supply the 12 volt loads becomes overcharged and, as a result, the grounded battery which supplies the 12 volt loads cannot be maintained in a charged condition at full voltage.

In order to correct this problem, battery equalizer circuits were developed and are the subject of my previous U.S. Pat. Nos., 4,479,083 and 5,528,122, both of which are herein incorporated by reference. The battery equalizer circuits of those patents are three terminal devices which are connected to the three terminals of two series connected batteries. They cause two series connected batteries of equal voltage to contribute equally to the current supplied to the 12 volt loads as if the two batteries were connected in parallel. The battery equalizer extends battery life by maintaining the voltages of the two batteries equal because the equalizer holds the voltage, at the intermediate terminal between the two batteries, at a voltage which is equal to one-half the sum of the two battery voltages. Therefore, neither battery becomes significantly overcharged or undercharged.

Battery equalizer circuits in the prior art, as well as the present invention, utilize a DC to DC converter circuit. The prior art teaches many varieties of DC—DC converter circuits to which the present invention can be applied. For use in a battery equalizer, a DC—DC converter transfers energy from one battery to the other. This is accomplished by using a reactive, energy transferring circuit element, which is switched in alternating connection to each battery by transistors used as switches. In some DC—DC converters the energy is received from the higher voltage battery and intermediately stored in one or two inductors or capacitors of the energy transferring circuit element during one-half cycle, and then is transferred to the lower voltage battery during the other half cycle. In others, the energy transferring circuit is a transformer which transfers energy by inductive coupling during each half cycle from the higher voltage battery to the lower voltage battery. The DC—DC converter portion of the circuit is not itself the present invention. Many varieties of DC—DC converters are shown in the prior art and the present invention is applicable to most of them.

The prior art also teaches control circuits, particularly pulse width modulation circuits, for controlling the transistor switches. The transistor switches are alternatingly switched on and off with a pulse width or duty cycle which is modulated as an increasing function of a feedback error signal. That error signal is the difference between the desired battery voltage and the actual battery voltage. Typically, the error signal is the difference between one-half the sum of the voltages of two series connected batteries and the voltage of the grounded one of the batteries.

Many common, popular DC to DC converter circuits include a transformer as the energy transferring circuit element. The transformer is switched in alternate connections to the batteries by means of transistor switches. This switching causes substantial transient variations, resulting particularly from a need which arises during higher current operation of the equalizer with a 50% duty cycle (the energy transferring circuit element being connected to the batteries by the transistor switches substantially 100% of the cycle, 50% in each alternate connection). The need is for a time interval between alternate connections of the transformer to the battery, during which all transistor switches are turned off in order to avoid any possibility of a momentary, short circuit through the transistor switches. These switching transients generate spurious noise, which can interfere with electronic instruments and equipment on board a vehicle. Consequently, it is necessary that filtering be provided.

It is an object and feature of the present invention to provide a circuit which maintains an essentially constant current through its main current conducting branches for all switching states of the DC—DC converter switching circuit, thus greatly reducing transient variations and making it possible to use considerably smaller and therefore less costly switching and filtering elements.

It is a related object and feature of the present invention to provide a preferred embodiment in which the current switched by the transistor switches of the DC—DC converter circuit at no time exceeds the current through either battery and therefore allows the use of less expensive transistor switches.

It is another object and feature of the invention to provide an overload detection circuit for detecting an excessive current in the equalizer circuit which could damage the equalizer circuit components, without consuming significant energy in the overload detection circuit.

Because battery equalizers use transformers with a ferromagnetic core, saturation of the transformer core must be avoided. A very small DC offset, such as a 50% duty cycle in one transistor switched current path and a 49% duty cycle for the other, will cause the operating point on the BH curve to migrate incrementally up or down the curve during each cycle. Traditionally, this problem has been addressed by making the switching control circuit as precisely symmetrical as possible, by providing a small dead-time interval, and by providing snubber circuits to leak off the incremental, unbalance of energy.

It is an object and feature of the present invention to prevent such migration of the operating point on the BH curve of the transformer in a manner which is highly effective because it effectively shorts out the transformer during each off-time interval, and yet does not waste energy because the excess transformer energy is returned into the circuit.

It is another object and feature of the present invention to provide an error signal detecting circuit, for detecting the voltage difference between the voltage on one of the batteries and the average of the voltages on all of the batteries, by a simple circuit which avoids problems ordinarily associated with the floating nature of a battery equalizer circuit with filter inductors in its main battery current conducting paths.

SUMMARY OF THE INVENTION

The invention is an improved three terminal battery equalizer circuit using a DC—DC converter of the type having transistor switches connected to a reactive, energy transfer circuit element with current conducting paths to each of three terminals of a pair of series connected storage batteries. The equalizer circuit has a first filter inductor interposed in the current conducting path between the transformer and the grounded terminal of the series batteries. A current conducting path is connected between the energy transfer circuit element and the interconnection node between the batteries. A second filter inductor is interposed in the current conducting path between the energy transfer circuit element and the third terminal of the series connected batteries. A crossover capacitor is connected between the filter inductors, preferably between the nodes at the transformer side of each filter inductor. Preferably the filter inductors are mutually coupled.

Figure 1:
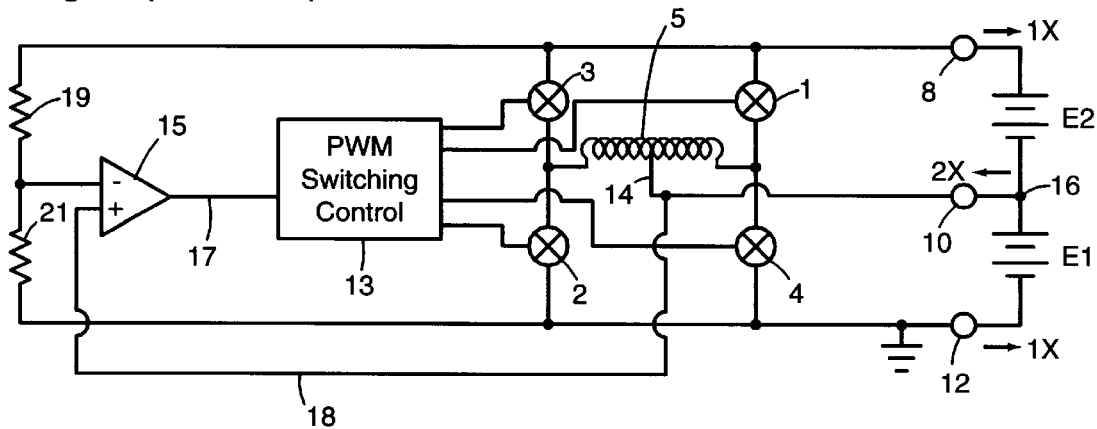
FIG. 1 is a simplified schematic diagram of a conventional, prior art battery equalizer circuit illustrating the principles of its operation and including no filter.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art. In addition, many circuits are illustrated which are of a type which perform well-known operations on electronic signals. Those skilled in the art will recognize that there are many, and in the future may be additional, alternative circuits which are recognized as equivalent because they provide the same operations on the signals.

Detailed Description

FIG. 1 illustrates a conventional, prior art battery equalizer circuit having switches 1, 2, 3 and 4, which conventionally are transistor switches. It is also possible in some embodiments to substitute diodes for switches 2 and 4 to accomplish similar switching action. The switches are connected to an autotransformer 5, which in turn is connected to the three terminals 8, 10 and 12 of a pair of series connected batteries E1 and E2. The switches 1–4 are connected in an H-bridge configuration to the autotransformer 5, and connected to the batteries E1 and E2 to form a DC to DC converter, which supplies power from the battery having the higher voltage to the other battery having the lower voltage. Other switching configurations and other reactive energy transfer circuit elements in addition to an autotransformer, including a standard transformer having a conventional primary and secondary, are used in the prior art for DC—DC converter circuits and are applicable to the present invention.

The control inputs of switches 1–4 are connected to a switch control circuit 13 which switches the state of the switches 1–4 in response to the magnitude of an error signal representing the difference between the average of the sum, Es, of the voltages of batteries E1 and E2, and the voltage on battery E1. The control circuit controls the duty cycle of the H-bridge switching connections as an increasing function of the error signal so that a greater imbalance in the battery voltages causes a higher duty cycle and an increased transfer of power from the higher voltage battery to the lower voltage battery.

In the operation of the circuit of FIG. 1, as well as the operation of the present invention, diagonally opposite switches are alternately switched on and off at a 180° phase shift. Consequently, switches 1 and 2 are on when switches 3 and 4 are off. The center tap 14 of the autotransformer 5 is connected through a current conducting path to the interconnection node 16 between the batteries E1 and E2. The switches 1–4 of the H-bridge alternately connect each half of the autotransformer 5, first across one battery and then in alternately reversed connection across the other battery. Although this switching nearly instantaneously switches the voltage of the battery applied to the windings, the current cannot change instantaneously. If the batteries have different voltages, then, after switching, each half winding of the autotransformer has a different voltage applied across it which results in a current change. The resulting small current change at a high rate of change causes the voltage polarity on the windings of the autotransformer 5 to reverse. If the batteries E1 and E2 are near the identical voltage, the current through both legs of the autotransformer 5 will only vary slightly about an average zero current.

If the voltage of one battery is less than the voltage of the other battery, then energy is transferred from the higher voltage battery to the lower voltage battery. For example, if battery E1, the grounded battery typically supplying accessories and equipment on a vehicle, is at a lower voltage, then the winding connected across battery E2 will receive power from battery E2. That energy is coupled to the winding connected across battery E1 and then transferred to battery E1.

When the batteries have a voltage imbalance, the currents through the three terminals 8, 10 and 12 are as illustrated in FIG. 1 with X representing a value greater or less than zero, which is proportional in magnitude to the difference in battery voltages. The currents through the conducting legs with terminals 8 and 12 are 1× in magnitude. The current in the conducting leg connected to the interconnection node 16 is the sum of the currents through each of the other two conducting legs connected to the batteries E1 and E2. Since the latter two currents are approximately equal, the sum of the currents is 2×. If the switches 1–4 were ideal switches which could be switched in perfect synchronism, these currents would remain constant over many switching periods and would gradually decrease to zero as the battery voltages are equalized.

As the batteries approach an equal voltage, the pulse width modulating control circuit reduces the duty cycle or on-time of the alternate pairs of switches below the maximum of approximately 50% for each alternate pair of switches.

Since the switches 1–4 cannot be controlled with perfect precision, it is necessary, even at a 50% duty cycle, to provide a brief off-time interval between the time one diagonally opposite pair of switches is turned off, and the time the other diagonally, opposite pair of switches is turned on. During this interval all switches are turned off. This assures that two series connected switches, such as switches 1 and 4, can never be simultaneously turned on and form a direct short circuit across the batteries and through any filter inductors used in the circuit. Unfortunately, these off-time intervals, which vary between a little more than 0% to nearly 50%, cause any inductors present in the circuit to generate large voltage spikes, which generate spurious noise, causing interference with electronic equipment on the vehicle.

Figure 2:
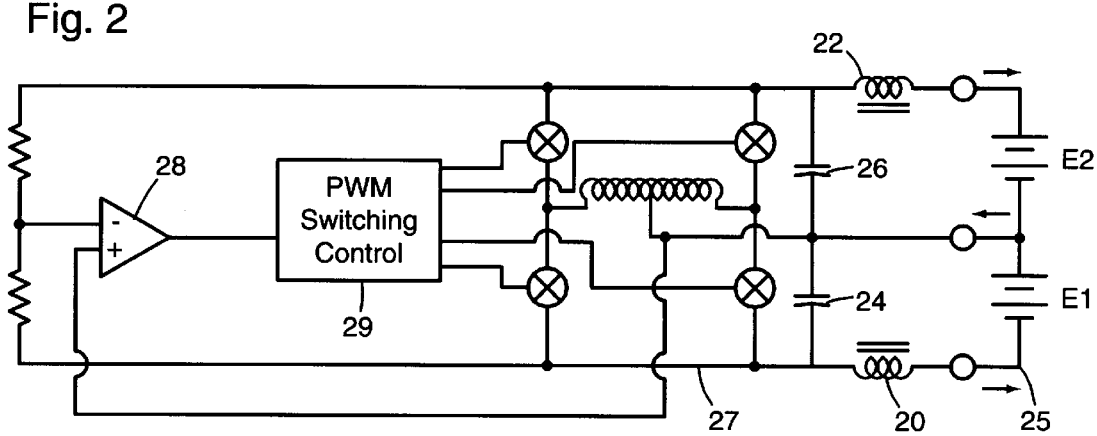
FIG. 2 is a schematic diagram of the circuit of FIG. 1 with the addition of a LC low pass filter connected in accordance with traditional filter principles.

The answer in the prior art to these switching transients is to provide a conventional LC low-pass filter of a configuration commonly used with power supplies for filtering out transient spikes. FIG. 2 illustrates a circuit to which the principles of a conventional filter have been applied. Filter inductors 20 and 22 have been interposed in the current conducting paths leading to the opposite battery terminals and filter capacitors 24 and 26 are connected to shunt the AC transients.

In a circuit of the type illustrated in FIG. 1, the control circuit is referenced to ground and includes a pulse width modulator controlled by an error signal at its input terminal 17. The pulse width modulator performs the voltage regulation function. The error signal is developed by applying, to one input of a differential amplifier 15, the battery E1 voltage by conductor 18 and applying to the other input of the differential amplifier 15 a voltage representing the average of the batteries E1 and E2 which is developed from a voltage divider having equal resistors 19 and 21.

However, the connection of the filter inductors 20 and 22 in the manner illustrated in FIG. 2 introduces a problem with the detection of the error signal for control of the switching. The filter inductor 20 isolates the switching and control circuit from the battery circuit. This creates a floating ground 27 which is isolated from the battery ground 25. The impedance of the filter inductor 20 will cause a voltage drop, which algebraically adds to the battery voltages applied to the differential amplifier 28. Consequently, this voltage drop becomes a component of the error signal applied to the pulse width modulator switching control 29. As a result, the introduction of filter inductor 20 inserts an erroneous component in the control signal, and this erroneous component is a function of the voltage across the filter inductor 20 and the current through it.

Figure 3:
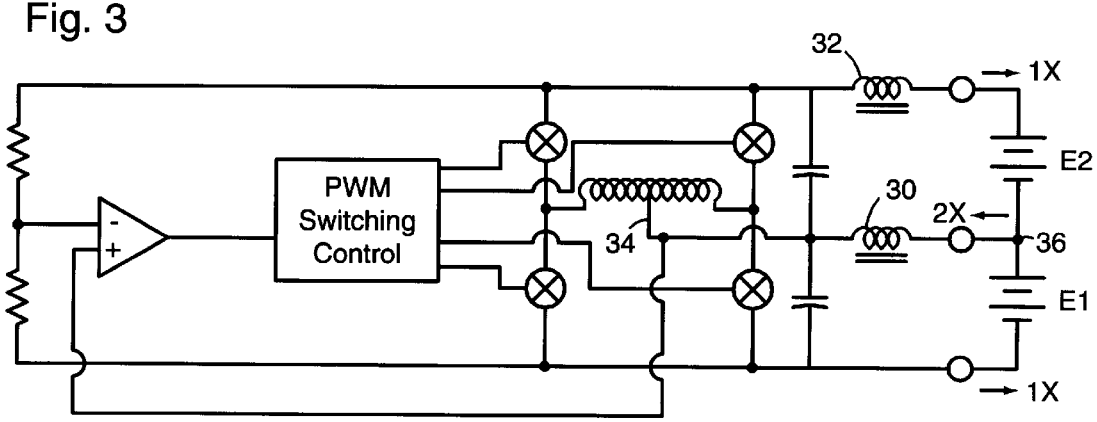
FIG. 3 is a schematic diagram of the circuit of FIG. 1, but having an alternative LC low pass filter connected in accordance with traditional filter principles.

One potentially alluring way of solving the problem of the floating fed-back control signal which one might be attempted to explore would be to connect the filter inductors 30 and 32 as illustrated in FIG. 3. By moving the filter inductor from the conducting path between the transformer and the grounded battery terminal and into the current conducting path between the transformer center tap 34 and the battery interconnection node 36, the isolation problem of introducing the voltage across the filter inductor as a component of the error signal is eliminated. Unfortunately, however, it is apparent from FIG. 3 that the current through the inductor 30 is twice the current in the other two current conducting legs. One undesirable consequence is that, with inductor 30 attempting to maintain a 2× current and inductor 32 attempting to maintain a 1× current, the current in inductor 30 varies substantially, periodically decreasing from 2× toward 1×, and increasing back to 2×. As a result, the current in inductor 30 generates substantial ripple. Another undesirable consequence is that the filter inductor 30 must be constructed to operate with a 2× current, and therefore must be more than twice as large and consequently more expensive than a filter inductor designed to operate at the 1× current.

Figure 4:
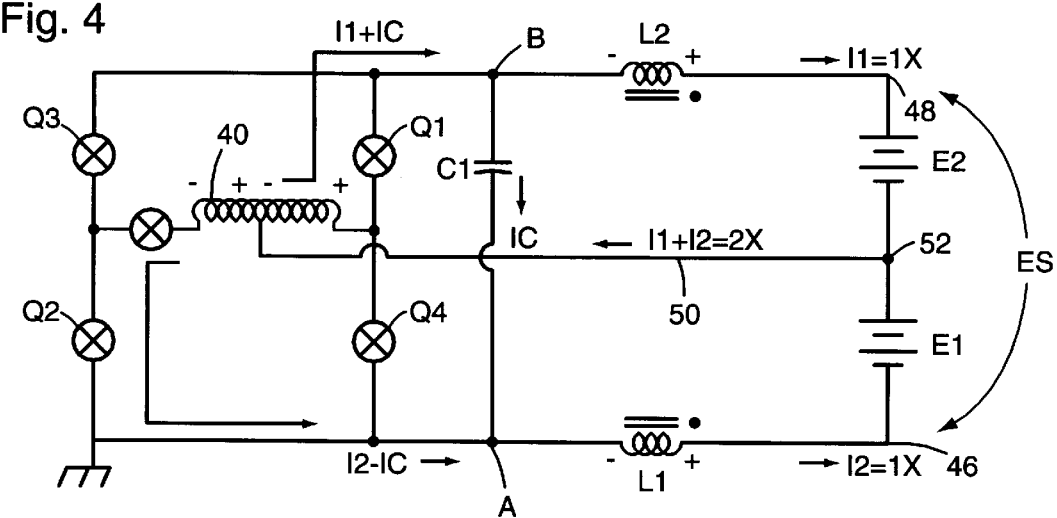
FIGS. 4–6 are simplified schematic diagrams of the preferred embodiment of the invention illustrating the operation of the preferred embodiment.
Figure 5:
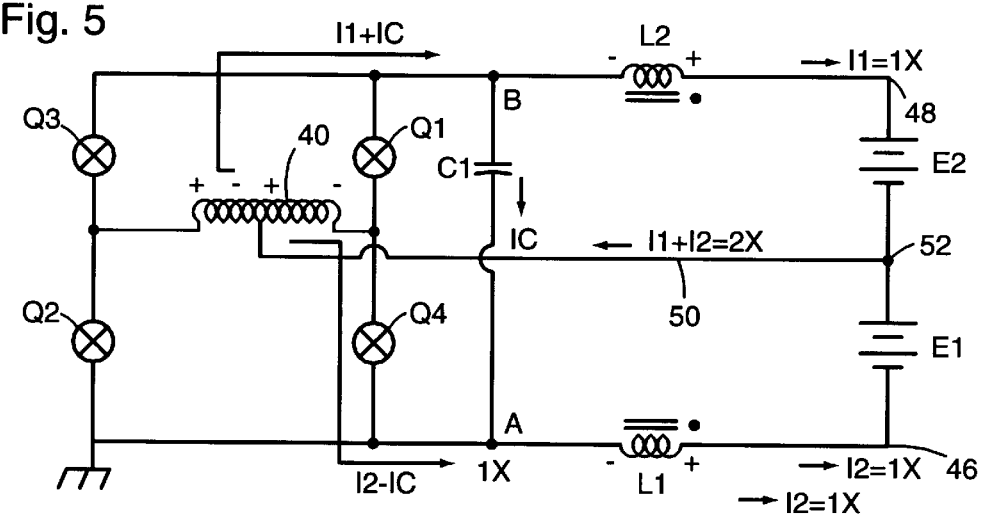
Figure 6:
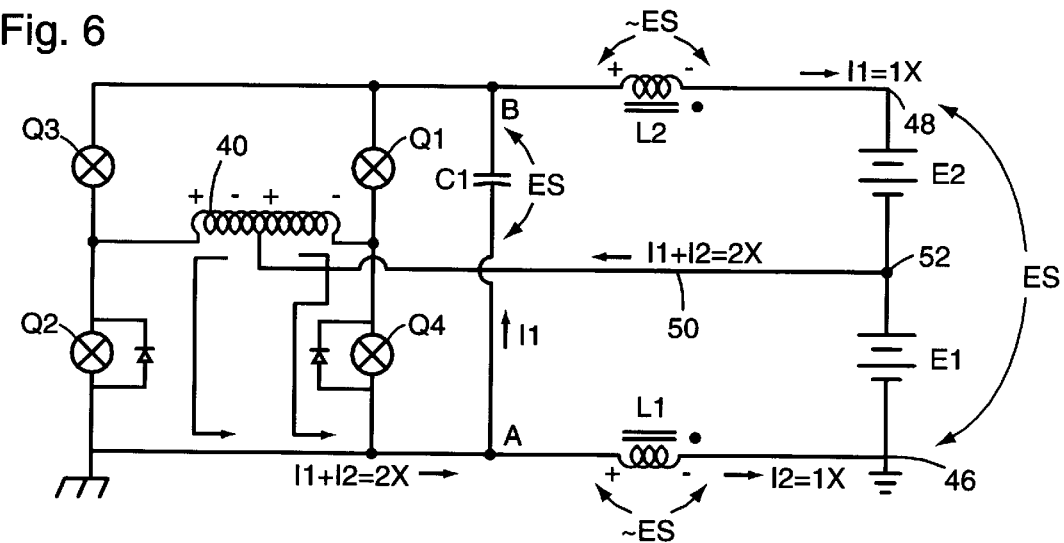

FIGS. 4, 5 and 6 illustrate the basic concept of the present invention. The circuit of FIG. 4 uses an autotransformer 40 as the energy transfer circuit element like the circuits of FIGS. 1–3. The autotransformer 40 is connected to switches 41, 42, 43 and 44, which are controlled by a switching control circuit (not shown), in the manner described in connection with FIGS. 1–3. A first filter inductor L1 is connected in one switched current conducting path between the autotransformer 40 and the battery ground terminal 46, and the other filter inductor L2 is connected in the switched current conducting path between the autotransformer 40 and the non-grounded, non-interconnected battery terminal 48 of the battery E2. A crossover capacitor C1 is connected between the filter inductors, and more specifically is connected to the filter inductor node on the transformer side of each filter inductor. The capacitor C1 is not connected to the center current conducting path 50, which is connected between the center tap of the autotransformer 40 and the interconnection node 52 between batteries E1 and E2. Preferably, though not necessarily, the filter inductors L1 and L2 are mutually coupled in symmetrical polarity, as illustrated in FIGS. 4–6.

The critically important consequences of this circuit are that the 1× current through the filter inductors, as well as the 2× current through the central leg 50, are all maintained at essentially constant values during all switching states of the transistor switches Q1–Q4, and additionally that the filter inductors L1 and L2 need to be designed only to carry a maximum current of 1×. Because the currents in each of the three legs of the circuit which are connected to the battery remain essentially constant for all switching states of the battery equalizer, filtering is considerably more effective. Because no inductor carries a current greater than the 1× current, the inductors may be smaller and consequently more inexpensive.

Figure 7:
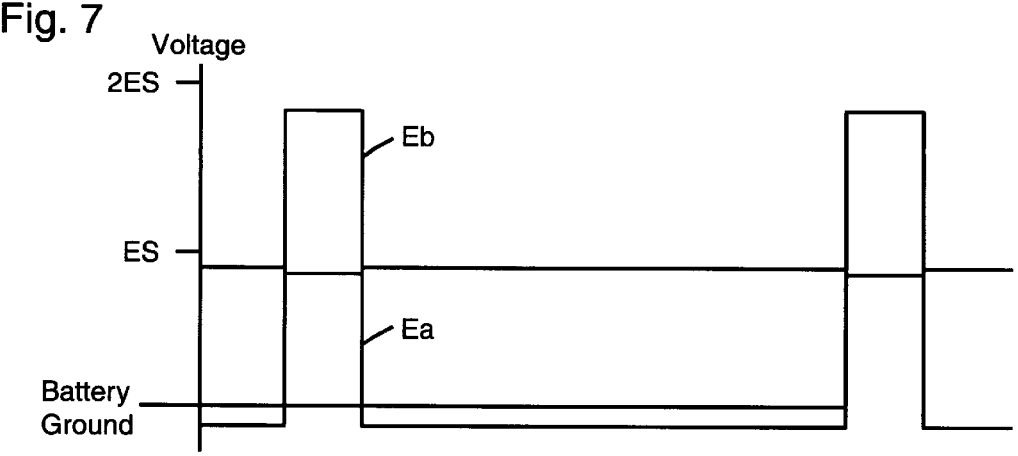
FIGS. 7–11 are oscillograms illustrating the operations of the preferred embodiment of the invention.
Figure 8:
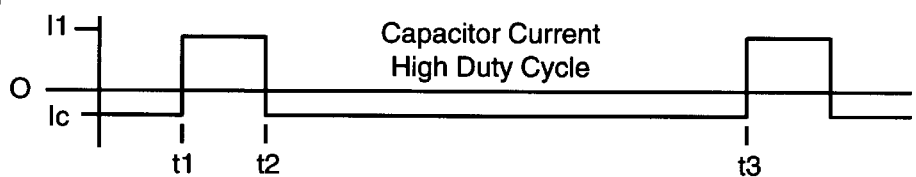
Figure 9:
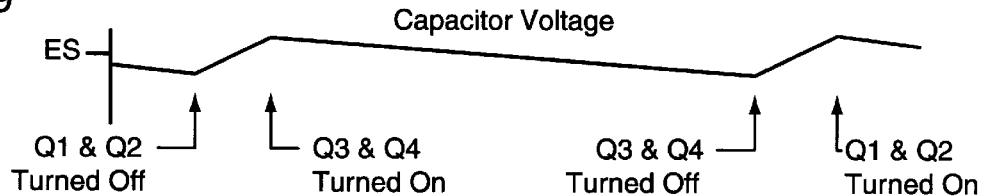

Operation of embodiments of the invention is illustrated in schematic diagrams of FIGS. 4–6, and in the oscillograms of FIGS. 7–11. The oscillograms of FIGS. 7–9 represent operation of the circuit with a nearly 50% duty cycle and show the transistor off-time in exaggerated proportion to facilitate illustration. The vertical scales are not proportional, but rather, for example in FIG. 9, are greatly enlarged to permit illustration.

FIG. 4 illustrates operation of the circuit with transistors Q1, Q2, Q3 and Q4 connected in an H-bridge for switching. Preferably these transistors are power MOS/FET transistors. Such transistors have an intrinsic diode which appears on an equivalent circuit of the transistor as a diode connected between the source and drain terminals. In FIG. 4, transistor switches Q1 and Q2 are in their on state, and transistor switches Q3 and Q4 are switched off. This state corresponds to the oscillogram illustrated in FIGS. 7–11 prior to the time t1. During this time interval, with battery E2 at a higher voltage than battery E1, battery E2 is driving the half of autotransformer 40 connected across battery E2 by switch Q1. The increasing current from battery E2 will induce a voltage across and a current through the autotransformer winding, connected through transistor switch Q2 across battery E1 to couple energy from battery E2 to battery E1. During that time interval a relatively small current Ic flows through capacitor C1, as illustrated in FIG. 8. Also during the time interval prior to time t1, the voltage Ea at node A, as illustrated in FIG. 7, will be slightly below the battery ground voltage at node 46, as a result of the current I2 flowing through filter inductor L1. Simultaneously, the voltage Eb at node B will be slightly below the voltage Es, which is the sum of the battery voltages E1 plus E2. The voltage on capacitor C1, during the interval before time t1, will be declining from a voltage slightly above Es to a voltage slightly below Es as a result of current Ic through capacitor C1.

At time t2, transistors Q1 and Q2 are turned off and a time interval is initiated between t1 and t2, during which all transistors are turned off. This state of the circuit is illustrated in FIG. 6. During the off-time interval between t1 and t2, the voltage Ea at node A rises to slightly less than Es, the sum of the battery voltages, and the voltage Eb at node B rises to slightly less than 2Es, as illustrated in FIG. 7. Also during the time interval between t1 and t2, some of the energy stored in filter inductors L1 and L2 is returned to the circuit by the collapsing magnetic fields which attempt to maintain the currents I1 and I2 through inductors L1 and L2. The 2× current flowing through the central conductor 50, which is the sum of I1+I2, continues flowing but now flows between the source and drain terminals of the MOS/FET transistors Q2 and Q4 through their intrinsic diodes. As an alternative, separate diodes could be attached parallel to the transistor switches, and as another alternative the two transistor switches Q2 and Q4 could be switched on, but neither of these are preferred nor necessary. This 2× current splits equally between the two half windings of the autotransformer 40 and the intrinsic diodes of Q2 and Q4, and flows down to node A. At node A the current splits with the 1× current I2 flowing through filter inductor L1, and the 1× current I1 flowing through capacitor C1 to node B, and then through filter inductor L2. Consequently, the use of the intrinsic diodes of MOS/FET transistor switches Q2 and Q4 and the cross-over capacitor C1 provides a path permitting the continued flow of the battery currents through filter inductors L1 and L2 at the same magnitude during the off-time interval as the current magnitude which existed while a pair of switching transistors were turned on. Consequently, ripple is minimized. In this manner, a continuous current is maintained regardless of the switching state of the transistors. The filter inductors store energy which is then provided to supply current during the time interval when all transistor switches are open, and the crossover path provides the necessary current path to maintain nearly constant DC currents.

Additionally, during the off-time interval between t1 and t2 the currents through the intrinsic diodes of the transistor switches, as well as the currents through the inductors never exceed the 1× current, therefore permitting the use of smaller inductors and transistor switches.

An additional advantage of the circuit operation described above and illustrated in FIG. 6 is that, during the interval when all four transistor switches are turned off, the current flow illustrated in FIG. 6 is essentially a short circuit across the autotransformer 40. This effective short circuit prevents migration of the operating point of the transformer up or down the BH curve into the saturation region, which would make the autotransformer inoperable. Traditionally saturation is prevented with such techniques as providing a small dead time interval, making sure the modulating circuit is precisely symmetrical and providing snubbers in the circuit to provide leakage to leak off any incremental unbalance in energy. However, these prior art techniques increase transients, and therefore generate spurious noise and the need for filtering, and also dissipate energy.

However, the circuit of the present invention effectively shorts out the transformer during each off-time interval to dissipate energy in the windings and bring the transformer back to a zero operating point in the middle of the BH curve. Consequently, migration of the operating point along the BH curve is avoided, thus preventing operation in the saturation region of the BH curve without wasting any energy to do so, because, as can be seen from FIG. 6, all energy is delivered back into the circuit and none is dissipated in resistive elements.

During the off-time interval between time t1 and t2 the capacitor current I1 flows in the opposite direction from Ic of FIG. 4 to recharge the capacitor C1 to a voltage slightly larger than Es, as illustrated in FIG. 9. With a 50% duty cycle, as illustrated in FIGS. 7–9, this current I1 is much larger than the current Ic, but flows for a much shorter time interval. Consequently, the voltage across the cross-coupling capacitor C1 is a triangle wave centered on the voltage Es with millivolts peak to peak. The current through capacitor C1 is constant in each direction and during the off-time interval is equal to the 1× battery current I1 flowing through battery E2, and consequently, as will be described below, can be detected as a measure of equalizer current for use in overcurrent protection.

FIG. 5 illustrates operation of the circuit when transistors Q3 and Q4 are turned on, until transistors Q3 and Q4 are turned off. This is the time interval between t2 and t3 in FIGS. 7–9. As can be seen by a comparison of FIG. 4 to FIG. 5, the current flow and operation between time t2 and t3 is essentially identical to the operation illustrated in connection with FIG. 4, with the exception that current flow from the autotransformer 40 is through transistor switches Q3 and Q4.

After time t3, transistors Q3 and Q4 are turned off so that all transistors are turned off again and operation is identical to that described in the time interval from t1 to t2, and illustrated in FIG. 6. Thereafter the cycle repeats.

Figure 10:
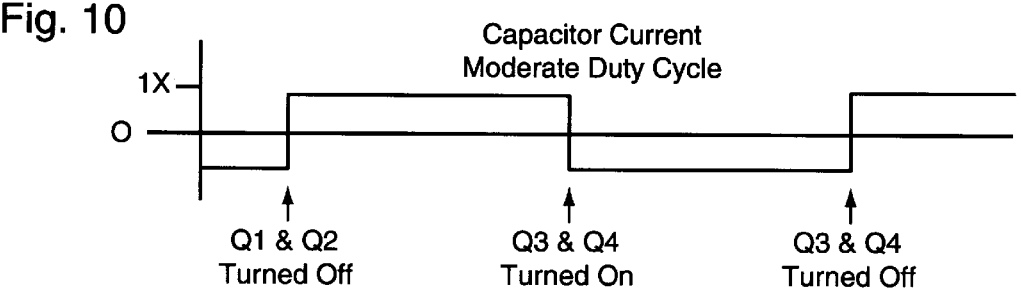
Figure 11:
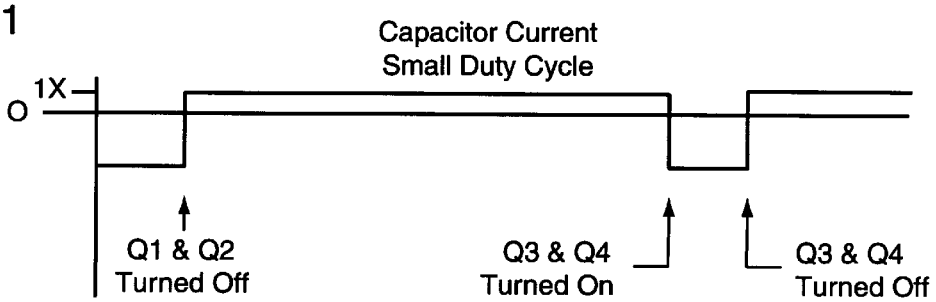

FIGS. 10 and 11 illustrate respectively the capacitor current for a moderate duty cycle and for a small duty cycle which would exist when the batteries are nearly of equal voltage. As the duty cycle becomes smaller, as a result of the equalization of the batteries, the 1× battery currents I1 and I2 and the 1× current I1 flowing through the capacitor C1 during the off-time is progressively reduced. For a moderate duty cycle of approximately 25%, as illustrated in FIG. 10, the opposite capacitor C1 currents, Ic and I1 are equal. For all operation, the integral of the crossover capacitor current in one direction is always equal to the integral of the crossover capacitor current in the opposite direction.

In order to control the pulse width modulator control circuit so that the duty cycle will be proportional to an error signal, which is the difference between the voltage of battery E1 and one-half the sum of the voltages of batteries E1 and E2, it is necessary to detect those two voltages and feed them back to the control circuit so that their difference may be derived. However, as described above and illustrated in FIG. 7, the presence of the filter inductors in the invention causes the voltage at nodes A and B to alternately increase and decrease in a periodic manner by an amplitude Es. This AC switching voltage at nodes A and B, which varies with respect to battery ground, interposes or adds an AC component of amplitude Es to any voltage fed back from the batteries to the control circuit. In the present invention, this AC component is eliminated by interposing an integrator circuit between the fed back voltage and the control circuit in order to integrate out the AC component.

Figure 12:
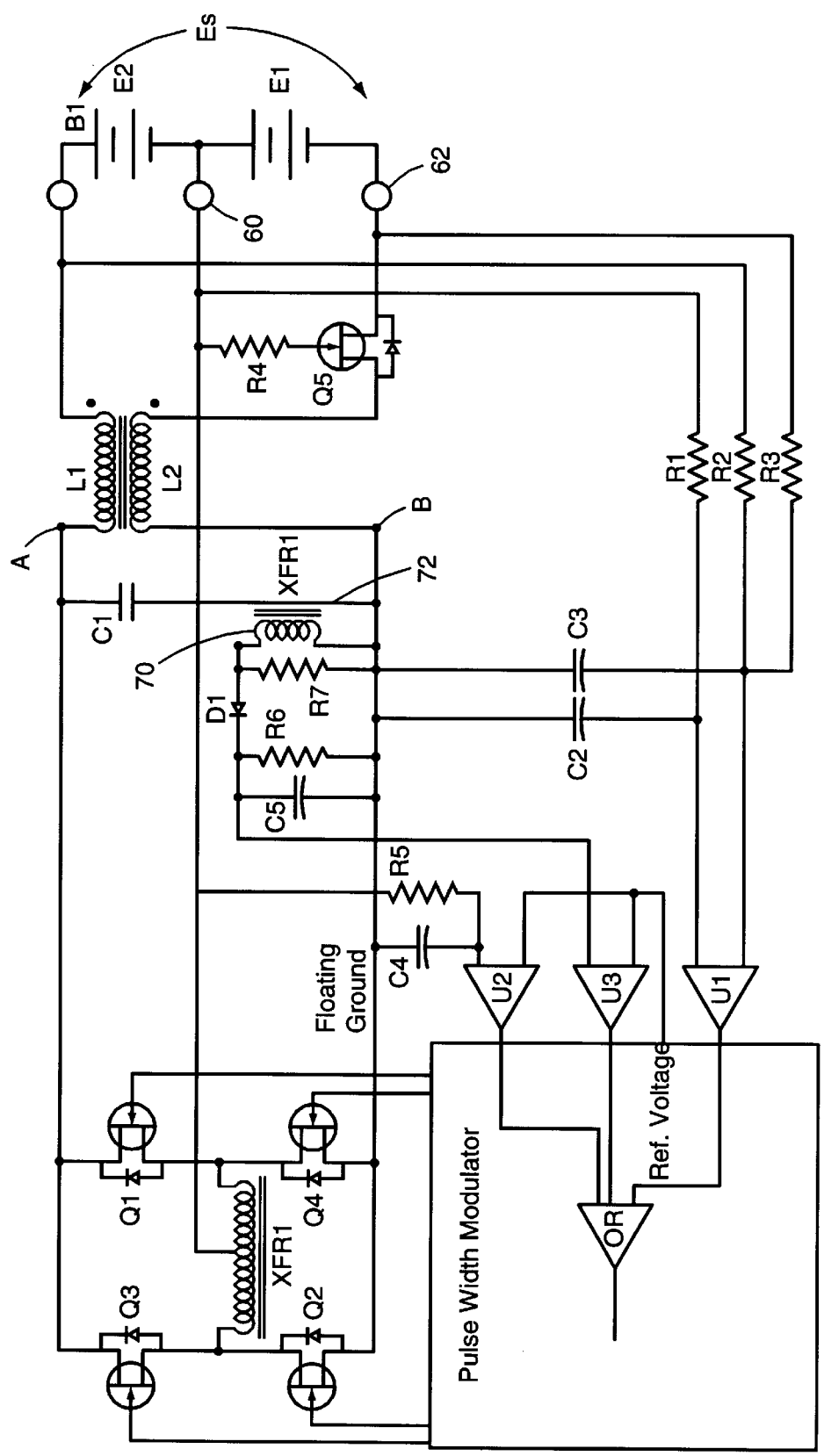
FIGS. 12 and 13 are more detailed schematic diagrams of circuits embodying the invention and illustrating additional components a features.

Referring more specifically to FIG. 12, the voltage of battery E1 is fed back from the central interconnection terminal 60 through an integrator circuit, comprising resistor R1 and capacitor C2, to a differential amplifier U1. The capacitor C2 is connected to the floating ground, node B, so that the fed back signal is integrated with respect to the floating ground and only the DC component of the battery voltage E1 is applied to the differential amplifier U1.

Similarly, a voltage divider, formed by equal resistors R2 and R3, provides a voltage equal to one-half of Es, which is applied through an integrating capacitor C3 also connected to the floating ground of node B, to the differential amplifier U1. Consequently, the output voltage of differential amplifier U1 represents the error signal, i.e. the difference between one-half Es and the voltage E1, with the AC component eliminated.

Although FIG. 12 illustrates the preferred manner of deriving the feedback control signals, the invention can utilize other types of signal detection and feedback, such as optical coupling.

The circuit of FIG. 12 also illustrates an improved current monitoring and overcurrent protection circuit. Traditionally, excessive and therefore potentially destructive equalizer current is monitored by interposing a small resistance in series with an output terminal so that the voltage across this current detecting resistor can be monitored and, when sufficiently excessive to potentially destroy circuit elements, cause a shut down of the circuit. However, the use of a series resistance wastes electrical power and also generates undesirable heat.

From FIG. 6 and oscillogram FIGS. 8, 10 and 11, it can be seen that during a portion of each cycle of operation, a current I1 flows through the crossover capacitor C1. Because this I1 is the same current magnitude as flowing through each battery, it may be monitored and utilized to detect an overcurrent condition. Therefore, as illustrated in FIG. 12, this cross-over capacitor current, through capacitor C1, may be detected by providing a transformer 70, having its primary 72 interposed in series with the capacitor C1, and its secondary connected to a resistor R7, to generate a voltage across R7 which is proportional to the battery current I1. That voltage may be applied to a rectifier circuit, preferably a half wave rectifier circuit, formed by diode D1 and resistor R6, to develop a DC voltage, which is proportional to the current through capacitor C1. This DC voltage is then integrated by an integrator capacitor C5 and applied to a comparator U3. The integration is performed because it is not the instantaneous value of current which destroys electronic components, but rather it is an overcurrent for a sufficiently long duration to cause heat dissipation exceeding the limits of the circuit element.

As stated above, the integral of the current Ic through capacitor C1 while the switching transistors are turned on, illustrated in FIGS. 4 and 5 and oscillograms 8, 10 and 11, must be equal to the integral of the capacitor current I1 through capacitor C1 while all transistor switches are turned off, as illustrated in FIG. 6. That is because, in the steady state, the capacitor cannot indefinitely accumulate charge. Therefore, the use of the integrating capacitor C5 permits the diode to be polarized in either direction, so that either the current Ic or the current I1, through the capacitor C1, is detected and integrated, and that integral represents the equalizer and battery 1× current. Furthermore, a full wave rectifier may also be used integrating the capacitor current over the entire cycle. Under all of these conditions, the voltage output from the integrating capacitor C5 is proportional to the battery currents supplied by the voltage equalizer.

Therefore, this circuit permits monitoring of the equalizer output battery current without interposing a series current monitoring resistor. Instead, the battery current is monitored at a low power level. A reference voltage is also applied to the comparator U3, which causes the pulse width modulator to go to a 0% duty cycle, preventing Transistors Q1–Q4 from turning on and thereby shutting down the equalizer circuit whenever the signal representing the integral of equalizer output current exceeds the limit represented by the reference voltage.

Figure 13:
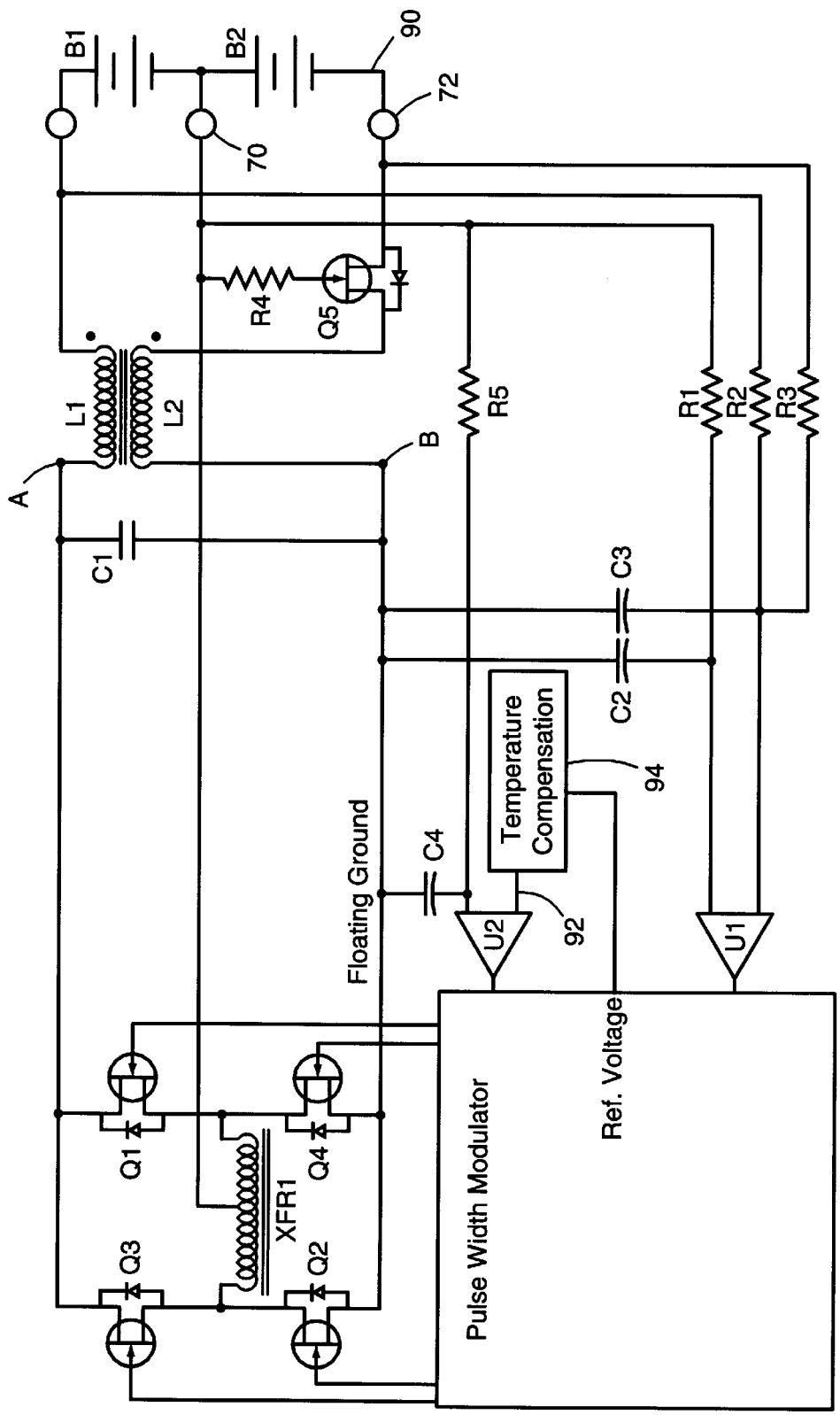

FIG. 13 illustrates a more preferred and less costly manner of providing overcurrent detection. The circuit of FIG. 13, like the circuit of FIG. 12, has an overcurrent protection, power MOS/FET Q5, which is turned off under potentially damaging operating conditions. The alternative manner of detecting equalizer output current recognizes that, in addition to the AC component across the filter inductor L2, there is a DC component resulting from the ohmic resistance of the filter inductor L2, as well as a DC voltage drop across the transistor Q5. Output current may be detected by detecting the voltage across the series inductor L2 and transistor Q5, and integrating that voltage to eliminate its AC components. Consequently, with reference to FIG. 13, the resistor R5 feeds back this voltage to comparator U2, and that voltage is integrated with respect to the floating ground of node B by capacitor C4 to eliminate the AC component and apply a DC voltage to comparator U2, which is proportional to the output current. A reference voltage is applied to input terminal 92 of comparator U2 and compared to the fed back output current signal so that the circuit is shut down in the event of an over current condition.

The elements used for detecting the over current, namely filter inductor L2 and transistor Q5 exhibit a resistance which varies as a function of temperature. Because the voltage resulting from current through that resistance is the feedback signal representing output current, it is desirable, although not necessary, to provide for temperature compensation. In the absence of temperature compensation, thermal variations will vary the output current at which the comparator U2 switches and shuts down the circuit. For example, at extreme cold temperatures the resistance of these components is required to shut down the circuit.

Temperature compensation is accomplished in the embodiment illustrated in FIG. 13 by providing a thermally responsive circuit 94, which varies the reference voltage applied to the comparator input 92 as a function of temperature. The temperature compensation circuit 94 increases the reference voltage applied to comparator U2 as an increasing function of temperature and approximately in proportion to the change in resistance across the inductor L2 and transistor Q5. This circuit is described further in connection with FIG. 14.

The output protection transistor Q5 in FIGS. 12 and 13 is switched in response to the voltage across the terminals 60 and 62 of FIG. 12 and terminals 70 and 72 of FIG. 13. More specifically, transistor Q5 is turned off by a short circuit or a reverse voltage across those terminals. Although a fuse or circuit breaker could be used, it is preferred to use a transistor Q5 which provides a circuit which can not only protect against a short, but also allow the current to immediately recover when the short circuit condition ceases.

The transistor Q5 circuit also protects against a reverse voltage which can occur if the ground terminal of reverse voltage which can occur if the ground terminal of the battery E1 becomes disconnected from the circuit while the equalizer terminals remain connected. If this occurs when a large current is flowing through an inductive load, such as through a starting motor, with the upper battery U2 still connected, a large, destructive current through the intrinsic diodes of the switches would flow and can cause damage. Since such a reverse current is, in effect, a short of the output, the protection transistor Q5 would appear to provide protection.

However, there is a problem. Under these fault conditions the equalizer would continue operating and develop a potential at the floating ground of node B, which is significantly below the battery ground. With the potential at the floating ground node B significantly below the battery ground potential, the ability to turn off the power transistor Q5 will be lost because, as the output voltage decreases it gets to a value at which the protection power transistor Q5 goes into its linear region of operation. In its linear region of operation, its resistance increases to a significant amount and it begins to dissipate substantial energy, coupled from the inductance of the load.

In order to avoid this problem, the circuit of FIG. 12 is provided with a resistor R5 connected to detect the output voltage at terminal 60 and compare it to a reference voltage applied to comparator U2. When the output voltage at terminal 60 falls below the level of the reference voltage, the comparator U2 switches states and causes the equalizer to be shut off. The circuit is designed so that the equalizer is shut off before the transistor Q5 goes into its linear region of operation.

Figure 14A:
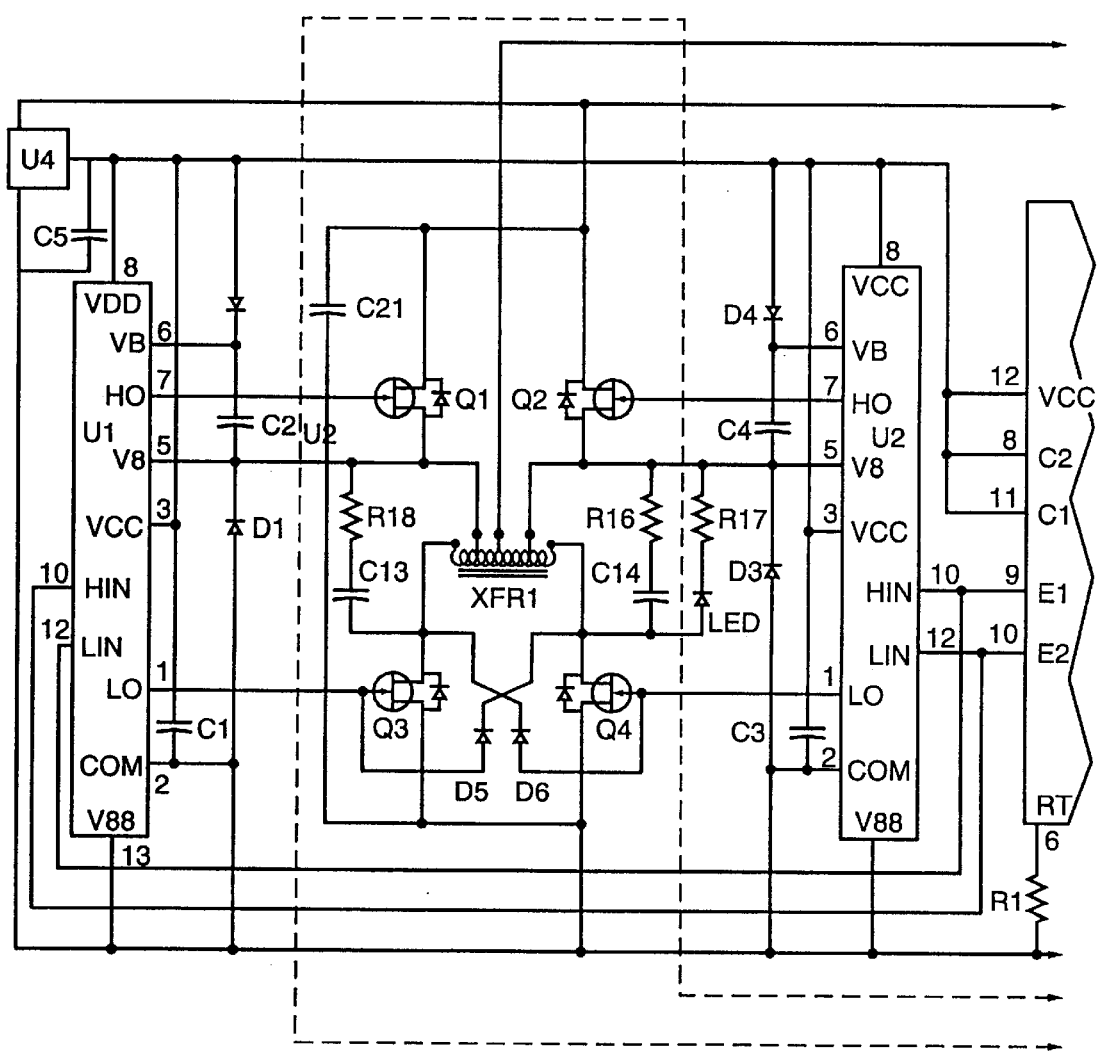
FIG. 14 is a detailed schematic diagram of the preferred embodiment of the invention.
Figure 14B:
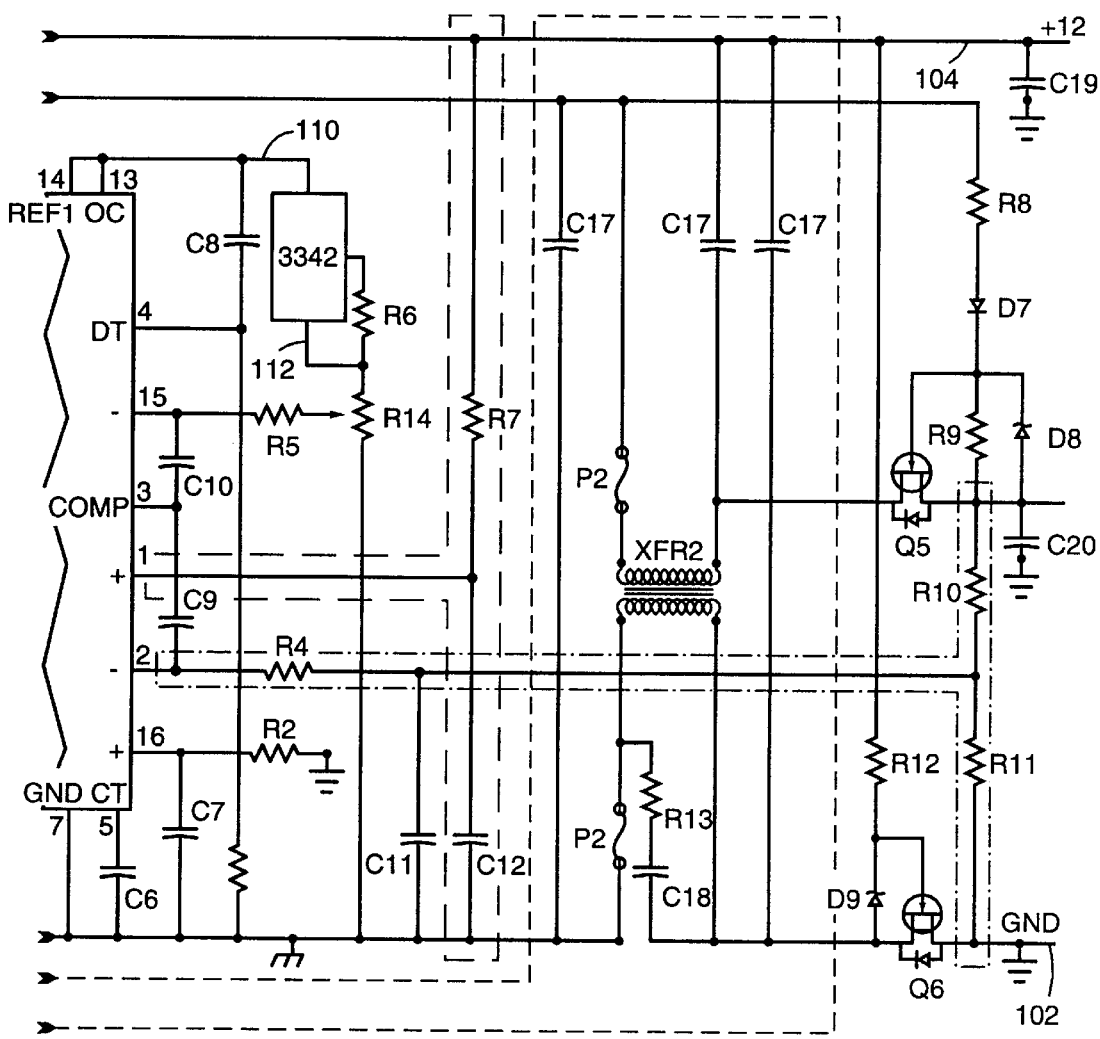

FIG. 14 is a detailed schematic diagram of the preferred embodiment of the invention. Integrated circuit U3 is a TL494, which is a commercially available pulse width modulator having differential amplifiers, logic circuits and comparators.

The voltage of the battery E1, which is the battery connected to the vehicle ground 102, is detected by the connection of terminal 104 through an integrator circuit comprising resistor R7 and capacitor C12. For detecting a voltage equal to one-half the sum of the two battery voltages, a voltage divider, comprising resistors R10 and R11, provides a voltage at its central node which is fed back to the control circuit U3 and integrated by integrator circuit of capacitor C11 and resistor R4.

The temperature compensation circuit described in 14. It uses a commercially available 334Z integrated circuit U5, which provides a resistance between its terminals 110 and 112, which is proportional to its absolute temperature. The slope of its temperature/resistance characteristic curve is determined by the resistance of resistor R6. The IC U5 is connected to potentiometer R14 to form an adjustable voltage divider, the voltage of which is applied through resistor R5 to the pulse width modulator U3 to provide a temperature compensated reference voltage.

As a consequence of the improvements described above, the circuit provides the advantages of greatly reduced costs and higher efficiency. In conventional prior art equalizer circuits, the filter inductors are typically on the order of 800 microhenries and the filter capacitors are typically on the order of 10,000 microfarads. With the present invention, the inductors may be on the order of 300 microhenries and the capacitors on the order of 250 microfarads, for example. In addition to cost reduction, the circuit of the invention provides higher efficiency because the smaller inductors additionally have a lower ohmic resistance and therefore lower heat loss.

While certain preferred embodiments of the present invention have been disclosed in detail, it is to be understood that various modifications may be adopted without departing from the spirit of the invention or scope of the following claims.

We claim:

1. A three terminal battery equalizer circuit including a DC—DC converter having transistor switches connected to a reactive, energy transfer circuit element with current conducting paths to each of three terminals of a pair of series connected batteries, the switches controlled by a control circuit connecting the energy transfer element in alternating connection to each battery, the equalizer circuit comprising:

(a) a first filter inductor in a switched current conducting path between the energy transfer circuit element and a grounded first terminal of a first one of the batteries;

(b) a current conducting path between the energy transfer circuit element and an interconnection node between the batteries;

(c) a second filter inductor in a switched current conducting path between the energy transfer circuit element and the non-grounded, non-interconnected terminal of the second one of the batteries; and (d) a capacitor connected between the filter inductors at the energy transfer circuit element side of each filter inductor.

2. A battery equalizer circuit in accordance with claim 1 wherein the filter inductors are mutually, magnetically coupled in symmetrical polarity.

3. A battery equalizer in accordance with claim 2 wherein the energy transfer circuit element is an autotransformer having a center tap connected to said interconnection node between the batteries.

4. A battery equalizer circuit in accordance with claim 3 wherein the switches are power MOS/FET transistors connected to the autotransformer in an H-bridge configuration.

5. A battery equalizer circuit in accordance with claim 1 and further comprising an overload detecting circuit having a current detecting circuit connected to the capacitor for detecting the capacitor current and an integrator circuit having an input connected to an output of the current detecting circuit for providing an output signal having an instantaneous amplitude which is proportional to the integral of the current through the capacitor.

6. A battery equalizer circuit in accordance with claim 5 wherein the overload detecting circuit more particularly comprises a transformer having a primary interposed in series connection with said capacitor, a resistive element in series with a secondary of the transformer, a rectifier having an input connected to the resistive element and an output connected to a capacitor.

7. A battery equalizer circuit in accordance with claim 6 wherein the filter inductors are mutually, magnetically coupled in symmetrical polarity.

8. A battery equalizer circuit in accordance with claim 7 wherein the integrator circuit is a half wave rectifier comprising a series diode and capacitor.

9. A battery equalizer circuit in accordance with claim 7 wherein the integrator circuit is a full wave rectifier and a capacitor.

10. A battery equalizer circuit in accordance with claim 1 further including a battery voltage feedback circuit comprising:
(a) a control circuit for switching the transistor switches;
(b) a voltage divider in dc connection across the distally opposite terminals of the batteries and having an output connected through an integrator circuit to an input of the control circuit providing a first feedback signal proportional to the sum of the voltages of the batteries; and
(c) an integrator circuit connecting the interconnection node between the batteries to an input of the control circuit providing a second feedback signal proportional to the voltage of one of the batteries.

11. A battery equalizer circuit in accordance with claim 10 wherein the node on the transformer side of one of said filter inductors is a floating ground, and wherein the control circuit and each of said integrator circuits is connected to said floating ground.

12. A battery equalizer circuit in accordance with claim 10 and further comprising an overload detecting circuit having a current detecting circuit connected to the capacitor for detecting the capacitor current and an integrator circuit having an input connected to an output of the current detecting circuit for providing an output signal having an instantaneous amplitude which is proportional to the integral of the current through the capacitor.

13. A battery equalizer circuit in accordance with claim 12 wherein the overload detecting circuit more particularly comprises a transformer having a primary interposed in series connection with said capacitor, a resistive element in series with a secondary of the transformer, a rectifier having an input connected to the resistive element and an output connected to a capacitor.

14. A battery equalizer circuit in accordance with claim 13 wherein the filter inductors are mutually, magnetically coupled in symmetrical polarity.

15. A battery equalizer circuit in accordance with claim 14 wherein the integrator circuit is a half wave rectifier comprising a series diode and capacitor.

16. A battery equalizer circuit in accordance with claim 14 wherein the integrator circuit is a full wave rectifier and a capacitor.

17. A battery equalizer circuit in accordance with claim 14 wherein the node on the transformer side of one of said filter inductors is a floating ground, and wherein the control circuit and each of said integrator circuits is connected to said floating ground.

18. A battery equalizer circuit in accordance with claims 1 or 2 or 3 or 4 and further comprising an overload detecting circuit comprising:
(a) an output current detecting voltage feedback resistor connected at one resistor terminal to said grounded first terminal of the first battery on one side of said first filter inductor;
(b) an integrating capacitor connected between a second terminal of the current detecting resistor and the opposite side of the first filter inductor; and
(c) a comparator having one input connected to the second terminal of the current detecting resistor and the other input connected to a voltage reference source.

19. A battery equalizer circuit in accordance with claim 18 and further including a temperature compensation circuit comprising: a thermally responsive temperature compensating impedance interposed between the voltage reference source and the other input of the comparator and varying the reference voltage applied to the comparator as a function of temperature.

20. A battery equalizer circuit in accordance with claims 1 or 2 or 3 or 4 and further comprising:
(a) an integrator circuit having an input connected to said grounded first terminal, the integrator circuit including a capacitor connected to the energy transfer circuit element side of said first filter inductor; and
(b) a comparator having one input connected to an output of the integrator circuit, another input connected to a reference source, and an output connected to said control circuit for turning off all transistor switches when the voltage at said grounded first terminal exceeds said reference source.

21. A method for equalizing the voltages of storage batteries connected in series to have distally opposite battery terminals and least one intermediate battery terminal, the method comprising:
(a) synchronously switching an energy transfer circuit element in alternately reversing connection to the distally opposite terminals of the batteries by alternately turning transistor switches, having shunt current paths, on and off in alternate pairs with interposed time intervals during which all transistor switches are turned off, while maintaining a central terminal of the energy transfer circuit element connected to an intermediate terminal of the series batteries;
(b) filtering current flowing through current conducting paths between the energy transfer circuit element and each distally opposite battery terminal by means of a filter inductor series connected in each path; and
(c) shunting half of a transformer current, which passes through the shunt current paths during said off time intervals, through a capacitor connected between the filter inductors.

* * * * *